United States Patent
Askestad

(10) Patent No.: US 10,633,935 B2
(45) Date of Patent: Apr. 28, 2020

(54) DEVICE FOR TERMINATION OF A RISER IN A FLOATING STRUCTURE

(71) Applicant: APL TECHNOLOGY AS, Kolbjørnsvik (NO)

(72) Inventor: Sigmund Askestad, Tvedestrand (NO)

(73) Assignee: APL TECHNOLOGY AS, Kolbjørnsvik (NO)

(*) Notice: Subject to any disclaimer, the term of this patent is extended or adjusted under 35 U.S.C. 154(b) by 58 days.

(21) Appl. No.: 16/072,539

(22) PCT Filed: Jan. 12, 2017

(86) PCT No.: PCT/NO2017/000002
§ 371 (c)(1),
(2) Date: Jul. 25, 2018

(87) PCT Pub. No.: WO2017/131526
PCT Pub. Date: Aug. 3, 2017

(65) Prior Publication Data
US 2019/0032428 A1 Jan. 31, 2019

(30) Foreign Application Priority Data
Jan. 27, 2016 (NO) .................................. 20160126

(51) Int. Cl.
*E21B 19/00* (2006.01)
*E21B 17/05* (2006.01)
(Continued)

(52) U.S. Cl.
CPC ............ *E21B 19/004* (2013.01); *E21B 17/05* (2013.01); *E02B 2017/0095* (2013.01); *F16L 27/053* (2013.01)

(58) Field of Classification Search
CPC .................. E21B 19/004; E21B 17/05; E21B 2017/0095; F16L 27/053
(Continued)

(56) References Cited

U.S. PATENT DOCUMENTS

| 4,266,886 A | 5/1981 | Milton |
|---|---|---|
| 5,336,020 A | 8/1994 | Askestad |

(Continued)

FOREIGN PATENT DOCUMENTS

| EP | 0270336 A2 | 6/1988 |
|---|---|---|
| EP | 1148207 A1 | 10/2001 |

(Continued)

OTHER PUBLICATIONS

International Bureau, International Search Report and Written Opinion in International Application No. PCT/NO2017/000002, dated May 10, 2017.

*Primary Examiner* — Anna M Momper
*Assistant Examiner* — Patrick F Lambe
(74) *Attorney, Agent, or Firm* — Leydig, Voit & Mayer, Ltd.

(57) ABSTRACT

A device for coupling a riser comprises a flexible joint comprising flanges, a ball joint with a housing comprising a mating face; a connection pipe comprising flanges; a guide pipe comprising a hang off face; a hang off structure underneath a flange of the connection pipe comprising a coned section with a surface contacting the connection pipe, a spline having parts fitting into the connection pipe, hang off segments attached to the hang off structure, the segments providing a load transferring surface; and an adapter fastened to the flexible joint housing comprising a mating surface complementary to a mating surface of the flexible joint housing; support regions; a coned section above a support region, ending at a distance from the hang off (Continued)

structure and in contact with the connection pipe; at least one of the support regions and the flexible joint housing being in contact with the guide pipe.

12 Claims, 6 Drawing Sheets

(51) Int. Cl.
*E02B 17/00* (2006.01)
*F16L 27/053* (2006.01)

(58) Field of Classification Search
USPC .......................................................... 166/345
See application file for complete search history.

(56) References Cited

U.S. PATENT DOCUMENTS

| | | |
|---|---|---|
| 2001/0031174 A1 | 10/2001 | Olivier et al. |
| 2006/0177276 A1 | 8/2006 | Stassen et al. |

FOREIGN PATENT DOCUMENTS

| | | |
|---|---|---|
| FR | 2858648 A1 | 2/2005 |
| GB | 2 313 889 A | 12/1997 |
| WO | WO 01/30646 A1 | 5/2001 |
| WO | WO 2005/003504 A2 | 1/2005 |

Section C - C

DEVICE FOR TERMINATION OF A RISER IN A FLOATING STRUCTURE

CROSS-REFERENCE TO RELATED APPLICATIONS

This patent application is the U.S. National Stage of International Patent Application No. PCT/NO2017/000002, filed Jan. 12, 2017, which claims the benefit of Norwegian Patent Application No. 20160126, filed Jan. 27, 2016, which are each incorporated by reference.

AREA OF TECHNOLOGY

The invention relates to floating structures connected to risers carrying produce. More specifically it relates to a device for connecting a riser coming from great depths to a floating device and a method for installing and servicing it.

INTRODUCTION

The invention concerns a device associated with a flexible (may also be a steel pipe suspended as a catenary from the floating structure) riser for floating structures such as drilling or production vessels for recovery of oil and gas as described in U.S. Pat. No. 5,336,020, belonging to APL—Norway. It is also beneficially used in offloading buoys such as the APL loading buoy described in the mentioned patent. The invention comprises a device for handling the large bending moments associated with flexible joints and a method for dismounting and maintaining the device while the floating unit remains moored offshore.

BACKGROUND TECHNOLOGY

Flexible joints between the top portion of the riser and the floating structure need to handle up to about 20-25 degrees of angular displacement. The traditional way of terminating flexible risers underneath a floating unit is:

a) by extending them all the way to the deck or turret of the floating structure and using bending stiffeners to reinforce the knuckle point at the lower extremity of a guide tube, which is a tubular rigid structure firmly fixed to the deck or turret, or b) by using a flexible joint at the lower extremity of a guide tube. Here the pipe extending up through a guide pipe as described in the referred patent may be strong enough for flexible pipes at moderate draughts, but as the risers are applied at greater water depths, and higher pressures, the riser tension is getting higher. As the tension is getting higher a transition in the industry towards using steel pipes instead of flexible pipes is taking place. The flexible part or ball joint connecting the catenary part of the riser with a short and stiff extension pipe/connection pipe inside the guide pipe will then be subjected to very high (moment) loads. The intention of the invention is to make a simple and maintainable interface between the top end of a riser and a floating structure, wherein a flexible part/ball joint at the top end of a riser is connected to an extension pipe/connection pipe (4 in FIG. 1) which in turn is connected to piping on a turret or other piping on a floating structure and may handle the high loads arising from greater depths and also centralize the pipe inside the guide pipe.

SUMMARY OF THE INVENTION

The invention describes a device for coupling a riser to a floating structure, wherein the device comprises: a flexible joint comprising a lower and upper flange, and a ball joint or flexible part with a rugged housing comprising a circular mating face at its rim; a connection pipe comprising a lower and upper flange; a guide pipe being firmly fixed to the floating structure comprising a hang off face on its upper rim, and a cylindrical rugged body having a diameter which is larger than the flexible joint; a coned hang off structure positioned underneath the top flange of the connection pipe comprising: a toroidal coned section narrowing towards its lower part, with a cylindrical inner surface contacting the connection pipe, a spline divided in at least two parts that fits in to a groove at the top of the inner cylindrical surface and a groove in the connection pipe, at least two hang off segments attached to the perimeter of the cylindrical part of the coned hang off structure, the segments providing a circumferential load transferring surface complementary to said hang-off face on the upper rim of the guide pipe; and an adapter fastened to the housing of the flexible joint comprising: a mating surface at the lower end of the adapter complementary to a mating surface at the rim of the flexible joint housing; a lower circumferential support region close to the mating surface; a further circumferential support region positioned along the length of the connection pipe; a coned section above the circumferential support region, ending at a distance from the hang off structure and in circumferential sliding contact with the connection pipe; where at least one of the support regions and the housing of the flexible joint being in close contact with the lower part of the guide pipe.

Furthermore the invention describes a method for initial mounting, dismounting and mounting a termination device, comprising the steps of: a) mounting a flexible joint at the top of the riser; b) mounting a connection pipe at the top of the flexible joint; c) mounting an adapter on to the flexible joint and connection pipe; d) mounting a hang off structure without hang off segments underneath the top flange of the connection pipe; e) mounting a pull-in wire going through the guide pipe on the top flange of the connection pipe; f) pulling the connection pipe and the adapter into the guide pipe so that the hang off structure is above the guide pipe; g) mounting the hang off segments on to the cylindrical part of the hang off structure; h) resting the hang off structure on the hang off face on the top rim of the guide pipe; i) dismounting the pull-in wire and j) mounting the top flange to the swivel piping.

Furthermore dismounting and mounting the termination device for service comprises the steps of: k) dismounting the top flange of the connection pipe from the swivel piping; l) mounting a pull-in wire on the top flange of the connection pipe; m) pulling the hang off structure up until the top flange of the riser is above the guide pipe; n) mounting a hang off structure including hang off segments underneath the top flange of the riser; o) resting the hang off structure on the hang off face on the top rim of the guide pipe; p) servicing and/or exchanging the flexible joint, the connection pipe and/or adapter; and q) performing the steps k-o in reverse order.

Preferred embodiments are described in the independent claims.

SHORT DESCRIPTION OF THE DRAWINGS

The device will be described with reference to the figures. Like numerals describe like parts in the different figures FIG. 1 shows a device for termination of a riser in a floating device with a turret.

DETAILED DESCRIPTION OF INVENTION INCLUDING EXAMPLES

Whenever terms like top/bottom or upper/lower are used, it is referring to directions when mounted in the guide pipe on site.

Figure 1:
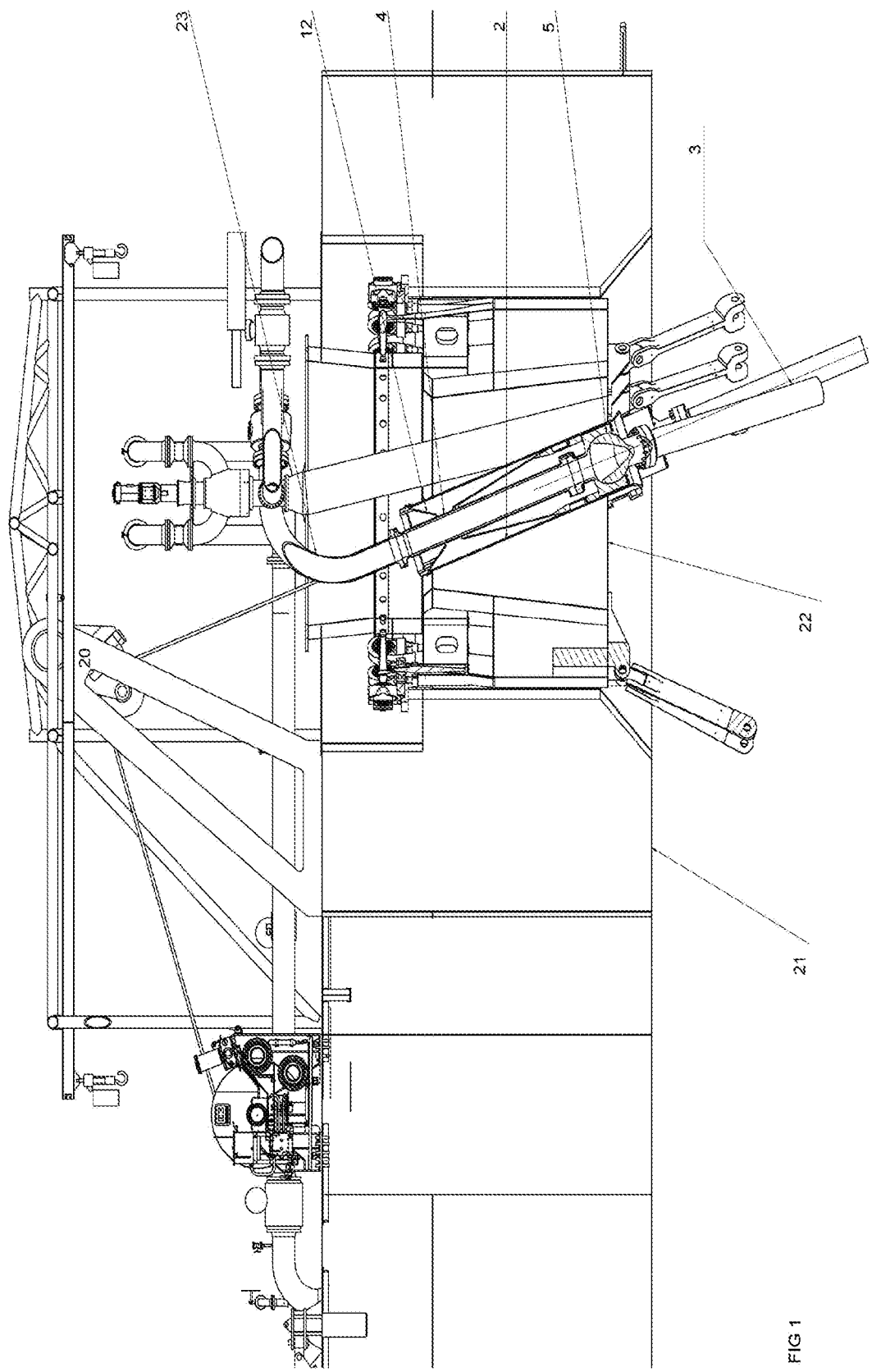

FIG. 1 illustrates a loading buoy 21 (the Buoy Turret Loading, BTL) anchored to the sea floor by mooring lines (not shown) suspended from mounts at the perimeter of the turret 22. A riser 3 is suspended in the turret 22 through a flexible joint 5 and is connected with the swivel piping 23 on the buoy through a connection pipe 4, sometimes called extension pipe. The connection pipe 4 is centralized in the guide pipe 2 by the flexible joint 5 or connection pipe adapter 9, hereinafter called adapter 9, in the lower portion of the guide pipe 2 and by a centralizing cone/hang off structure 12 in the upper part of the guide pipe 2. The riser tension is transferred via the flexible joint 5 and the connection pipe 4 to the top rim of the guide pipe 2, as the connection pipe 4 is suspended at the top rim of the guide pipe 2 by two hang off segments (13, 14) being clamped on to the outer perimeter of the hang off structure 12. The lateral loads originating from shear loads in the riser 3 and from the angular effect of the riser tension are supported by the faces of the support regions 24, 25.

The bending moments induced from the internal friction inside the flexible joint 5 itself and substantial geometric load effects are transferred to the guide pipe 2 as radial loads between the support regions 24, 25 in the lower end of the guide pipe 2 and hang off structure 12 in the upper of the guide pipe 2. via a rugged housing 6 of the flexible joint 5 to the adapter 9 through the bolted connection 7 between the flexible joint 5 and the adapter 9, and then further via the adapter 9 and connection pipe 4 to the guide pipe 2. Furthermore the top end 8 of the adapter 9 is advantageously ending some distance beneath the hang off structure 12 and provides radial sliding support to the connection pipe 4, as shown in FIG. 1, where the moment load effects from the flexible joint 5 are at an acceptable level for the connection pipe 4 to handle. The advantage being that the connection pipe 4 is mainly subjected to tension loads while the stiffer adapter 9 and guide pipe 2 take care of the bending moments and provide for simple load determination; furthermore internal possibly high, uncertain loads arising from such as thermal effects are avoided (e.g. in case the adapter cone was extended all the way up to the hang off structure). In order to service the termination device on board, a crane 20 that is able to take the strain from the riser 3 is preferably available on the buoy 21. Joint connections between a stiff riser and the suspension in a buoy/floating structure are used for handling the large angular relative motions arising in rough seas. Thus substantial bending moments at the suspension points are relieved. However, quite large bending moment effects remain at the suspension points even when using flexible joints 5 for bridging the riser 3 and the connection pipe 4 to the floating structure 21. This is due to:
a) the internal frictional moments in the large flexible joint 5 and b) the geometric eccentricity effects of the distance from the rotation center of the flexible joint 5 and the lower rim 10 the guide pipe 2.

The moment effects from the flexible joint 5 are largely handled by the large diameter and stiff adapter 9 while the small diameter and hence more flexible connection pipe 4 is relived of the bending moments from the riser 3 and flexible joint 5 and the connection pipe 4 is thereby advantageously handling mainly the riser 3 tension and internal pressure. The induced bending moments (from the internal resistance in the flexible joint 5 and geometric effects) are transferred through the upper rugged part of the flexible joint 5 housing 6 and to the bolted connection 7 between rim of the flexible joint 5 and the adapter 9, and further on to the adapter 9 which is in close contact with the connection pipe 4 at the top end 8. The moment induced reaction forces between the adapter 9 and the connection pipe 4 will be between the top end 8 of the adapter 9 and the support regions 24 and 25 which is areas of contact between the adapter 9 and the guide pipe 2. In the alternative configuration shown in FIG. 4 the reaction loads between the connection pipe 2 and the assembly comprising the adapter 9 and the flexible joint housing 6 will for correspondingly be between the top end 8 of the adapter 9 and the support region at the outward face of the flexible joint housing 6.

Figure 2:
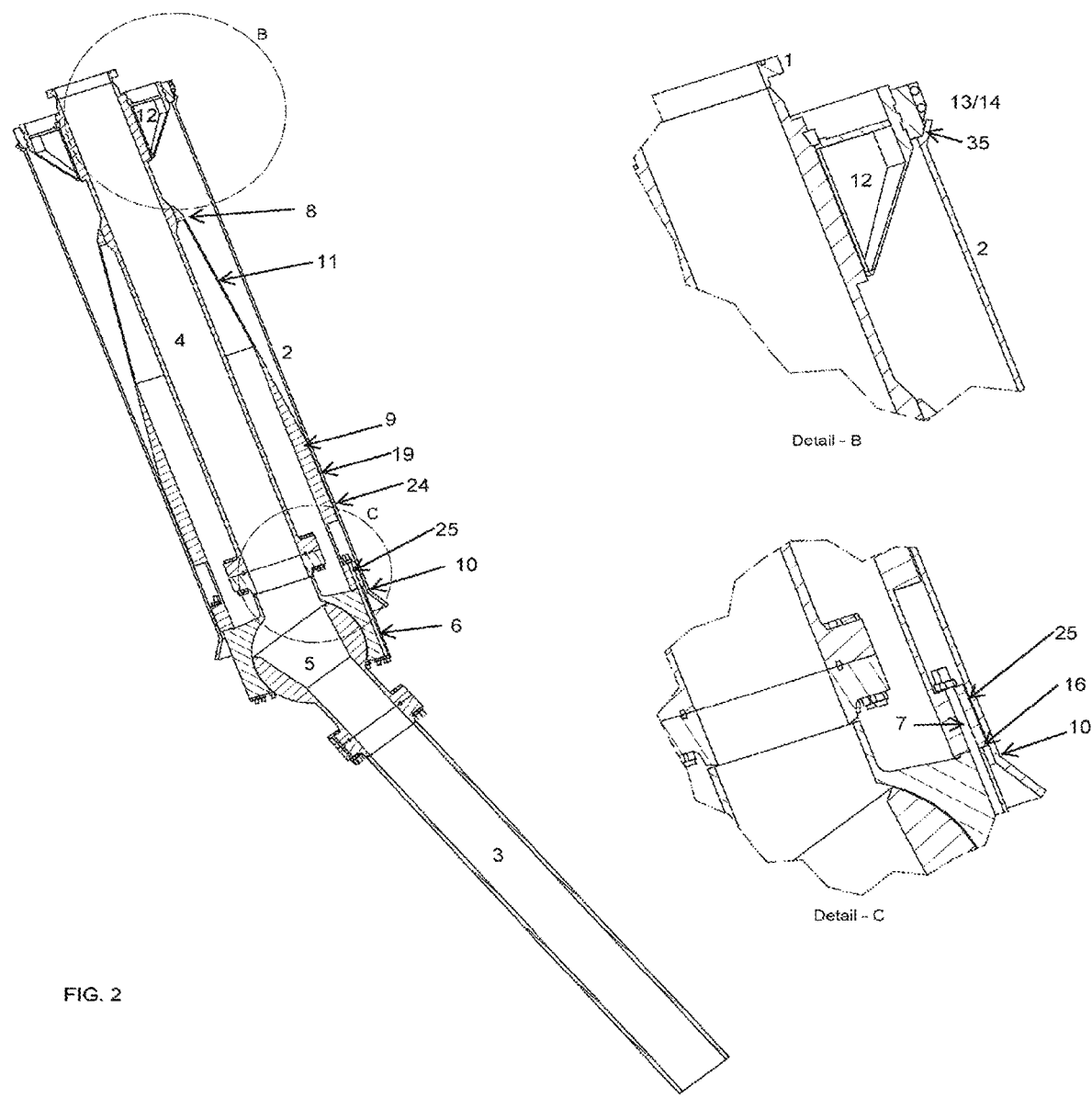
FIG. 2 shows an embodiment with the flexible joint, connection pipe, adapter and hang off structure resting in the guide pipe.

The clearance between the surfaces of the flexible joint 5 and/or adapter 9 transferring radial load and the guide pipe 2 is typically between 0.5 and 10 mm, more preferably between 1 and 4 mm. The length of the guide pipe 2 is preferably slightly shorter than the combined length of the connection pipe 4 and the flexible joint 5 stretching from the hang off structure 12 at the top to the region of the flexible joint at the bottom. FIG. 2 illustrates an embodiment where the connection pipe 4, the adapter 9, the flexible joint 5 and the hang off structure 12 are assembled in the guide tube 2. According to this embodiment the connection pipe 4 and the hang off structure 12 are both in one piece and the top flange 1 of the connection pipe 4 is a small diameter compact flange enabling the adapter 9 and the hang off structure 12 to be guided past the top flange.

The adapter 9 comprises: a mating surface 16 at the lower end of the adapter 9 which is fixable to a mating surface on the flexible joint 5, preferably at the rim of the flexible joint 5, preferably by bolts as shown in FIG. 2; a lower support region 25 close to the mating surface of the adapter 9 whose diameter is slightly less than the guide pipe 2 and where sideway forces originating from the riser 3 are transferred to the guide pipe 2; at least one further support region 24, which may be with a slightly larger clearance to the guide pipe than the support region 25, positioned along the length of the connection pipe 4; a coned section 11 above the uppermost support region, wherein the coned section 11 ends at a distance from the hang off structure 12. The lower portion of the adapter 9 may beneficially be provided with a cylindrical section 19 as shown in FIG. 2, if the connection pipe 4 is long, as may be the case in large structures, for improved stiffness and simplicity of fabrication. Optionally circumferential support structures may be provided, stretching radially inward from the adapter to the connection pipe 4 at one or more locations along the length of the connection pipe 4 for radial support of the connection pipe 4 and comprising sliding contact between the adapter 9 and the connection pipe 4 (not shown). Furthermore the adapter may be provided with longitudinal structures such as ribs to make the adapter stiffer and/or fill the gap between the smaller diameter adapter and the larger diameter guide pipe 2.

The connection pipe 4 is further provided with a circumferential protrusion 26 at the top end of the adapter 9, wherein the protrusion 26 fills the gap between the connection pipe 4 and the adapter 9, thus allowing the radial reaction loads from the moments in the adapter 9 originating from the riser 3 to be supported by the top end of the connection pipe 4. This reaction load sets up a shear load in the connection pipe 4 and subsequently a moment. This moment is however substantially less than the moment arising in the connection pipe 4 without the much stiffer adapter 9. The main portion of the reaction loads in the connection pipe 4 is further transferred to the guide pipe 2 by radial contact between the hang off structure 12 and the hang off face 35 at the top rim of the guide pipe 2. The remainder of the radial supporting load is according to the principles of lever arms supported by the support region 25 in the lower end of the guide pipe 2. Yet another protrusion 27 is situated at the same height as the hang off structure 12 and ensures circumferential contact between the hang off structure 12 and the connection pipe 4. The hang off structure may have an internal diameter permitting the hang off structure 12 to be guided past the top flange 1. Obviously the hang off structure 12 can be split in two and the corresponding protrusion 27 can be left out altogether. The hang off structure 12 is attached to the connection pipe 4 with locking elements known in the art or as described later in the text.

Figure 3:
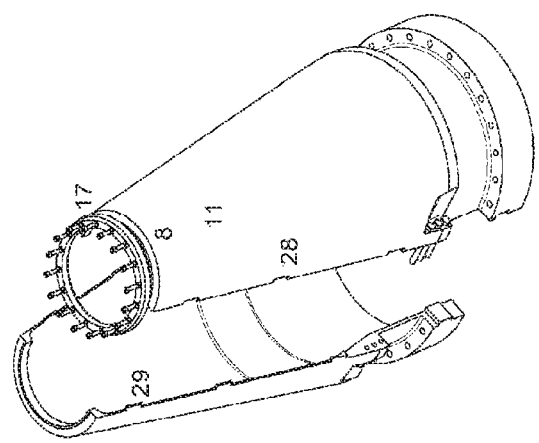
FIG. 3 shows an embodiment with split adapter.
Figure 3:
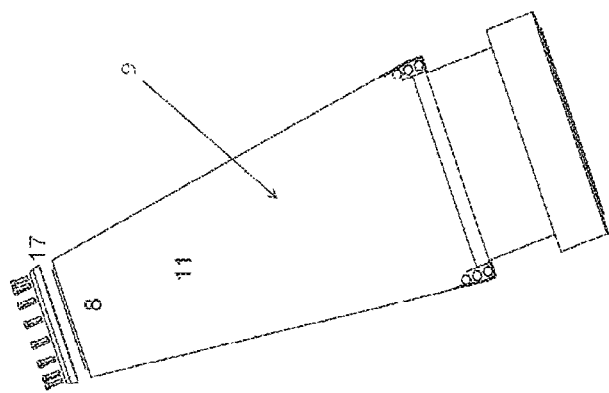
Figure 3:
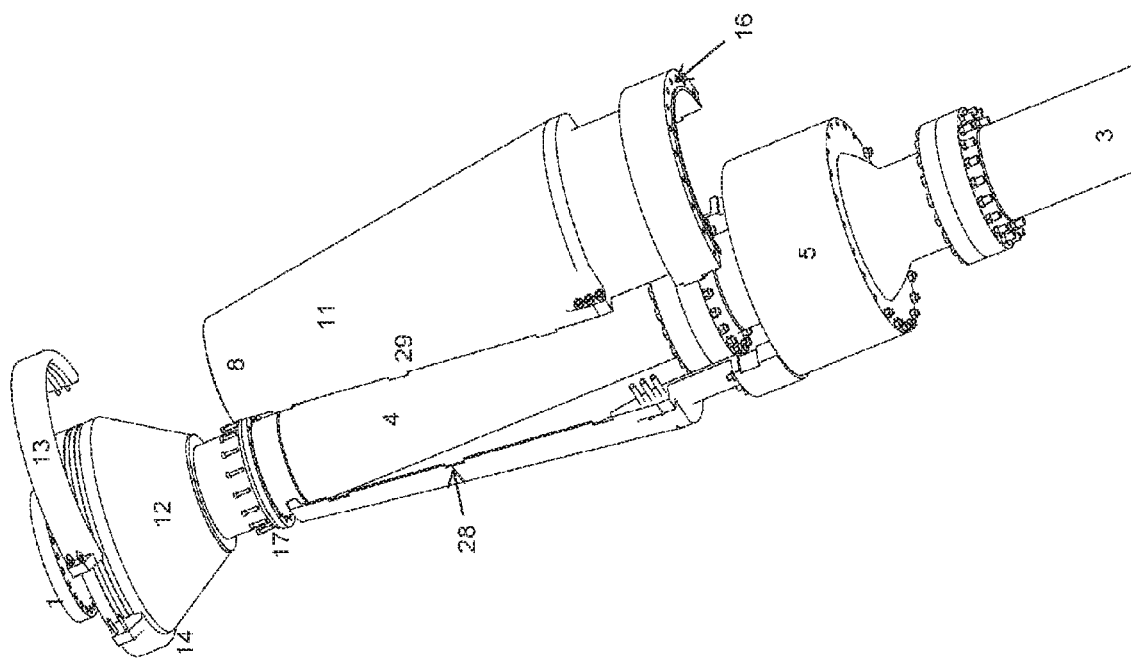

FIG. 3 illustrates an embodiment where the adapter 9 is split in two. The adapter 9 may be split in two or more parts in the longitudinal direction and ha a mating surface 16 at its lower end, which is in locking contact with the mating surface at the rim of the flexible joint housing 6 and whose top end 8 is in sliding contact with the connection pipe 4. The outer surface in the support regions 24, 25, and flexible joint housing 6 is at least partly in sliding contact with the guide pipe 2. The purpose of the adapter 9 is to take up the large load effects in particular the bending moments originating from the riser 3 and internal resistance in the flexible joint 5 and which is conveyed to the connection pipe 4 (through the flexible joint 5). This purpose is achieved by the adapter 9 having a lower end fixed to the flexible joint 5, preferably the rim of the housing 6, thus taking up the bending moment from the flexible joint 5. The adapter 9 is then radially supported in the guide pipe 2 by at least one of: the lower support region 25, the support region 24, the cylindrical section 19 and the housing 6 of the flexible joint 5, being firmly fixed to the adapter 9. Furthermore the top end 8 of the adapter 9 is, like the adapter in FIG. 2, radially supported by the connection pipe 4 but free to slide axially.

When assembled, the adapter will carry the major portion of the bending moment from the flexible joint and relive the lower end of the connection pipe 4 for bending moment effects.

If the adapter 9 is split in two or more sections in the longitudinal direction as shown in FIG. 3, the sections need to be fixed to each other in a manner that is sufficiently stiff, preferably by a combination of bolts, "tongue and grooves" and securing ring(s) as shown in FIG. 3. At the top end of the adapter a securing ring 17 comprising one or more parts bridging the different sections is beneficially keeping them together at the top end 8. The ring 17 is typically configured with an inward facing cylindrical surface contacting a corresponding outward facing cylindrical surface, thus keeping the adapter 9 segments assembled. Bolts in a direction parallel to the piping are provided to ensure that the ring remains in position. Furthermore the different sections is preferably provided with matching grooves 28 and tongues 29 in order to counter the moment induced shear loads arising between the different sections of the adapter 9.

The coned adapter 9 is designed only to handle the bending moments originating from the riser and permits a shorter adapter length than e.g. a cylindrically shaped adapter designed for handling also the riser tension. The coned section 11 of the adapter has two functions apart from distributing loads:

1. It eases the initial mounting when the riser 3 is connected to the swivel piping 23 via the flexible joint 5 and the connection pipe 4. A cylindrically shaped adapter 9 might be trapped by the edge of the guide tube 2 if the angle between the riser 3 and the guide pipe 2 is large.

2. It keeps use of material and corresponding weight to a minimum as its diameter tapers off at a similar rate as the bending moment from the riser 3 reduces further away from the riser 3.

Figure 4:
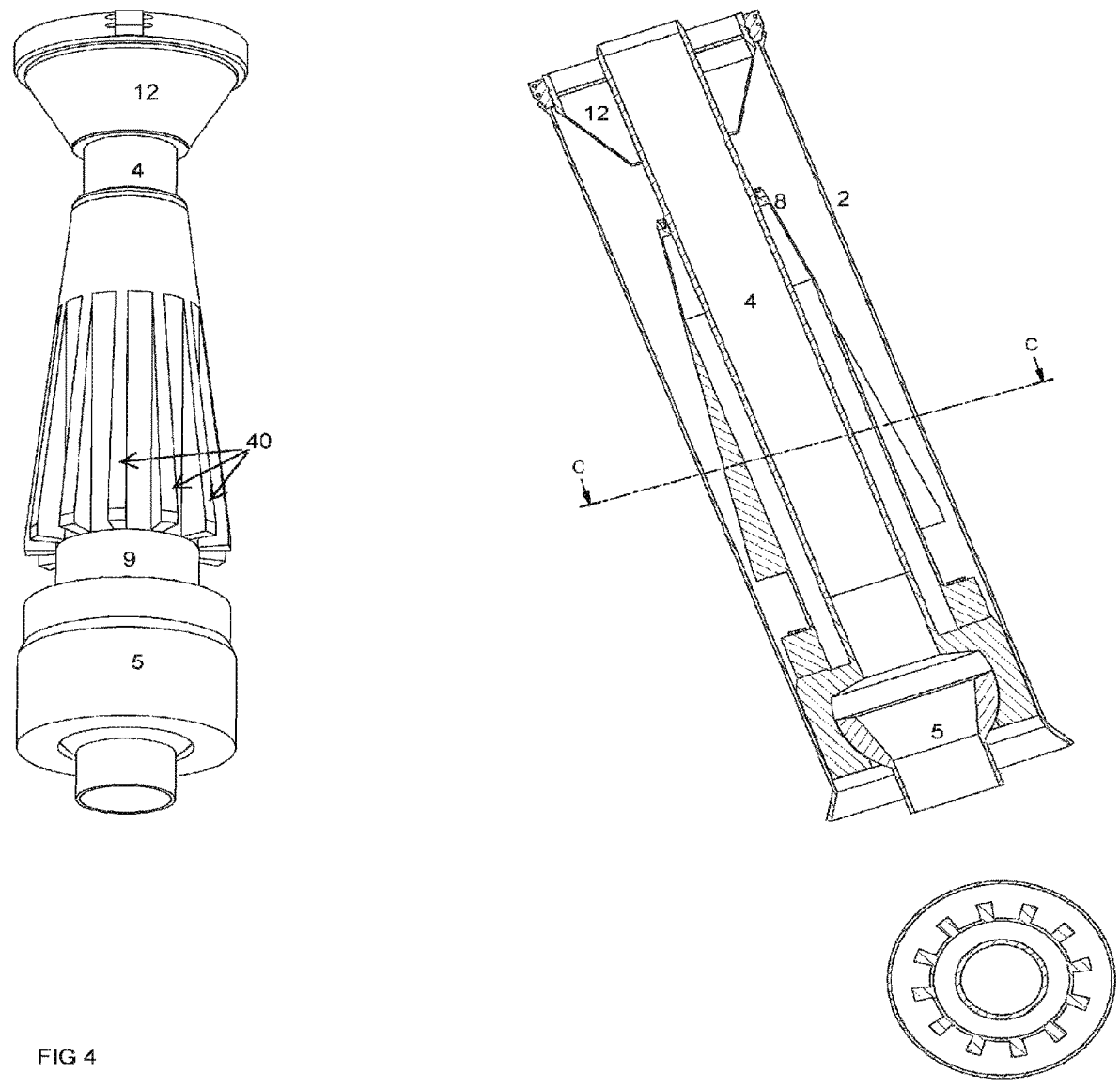
FIG. 4 shows an embodiment with external ribs on the adapter.

FIG. 4 shows an embodiment where the connection pipe 4 and the flexible joint 5 is made into one piece and where the entire housing 6 of the flexible joint 5 is fitted inside the guide pipe 2 and has a larger diameter than the adapter and a suitable contact surface on the periphery of the housing 6.

The adapter is further bolted to the flexible joint by ordinary bolts terminating in tapped holes in the housing 6. This is beneficial for the replacement operation of the flexible joint as the minimum lifting height is reduced. The advantage being that the flexible joint 5 is supported in the guide pipe 2 just at the center of rotation for reduced bending moment effects. The coned section 11 of the adapter 9 is formed by a number of ribs 40 with a triangular shape being welded on to a pipe with a radius slightly larger than the connection pipe 4 for ease of fabrication.

Figure 5:
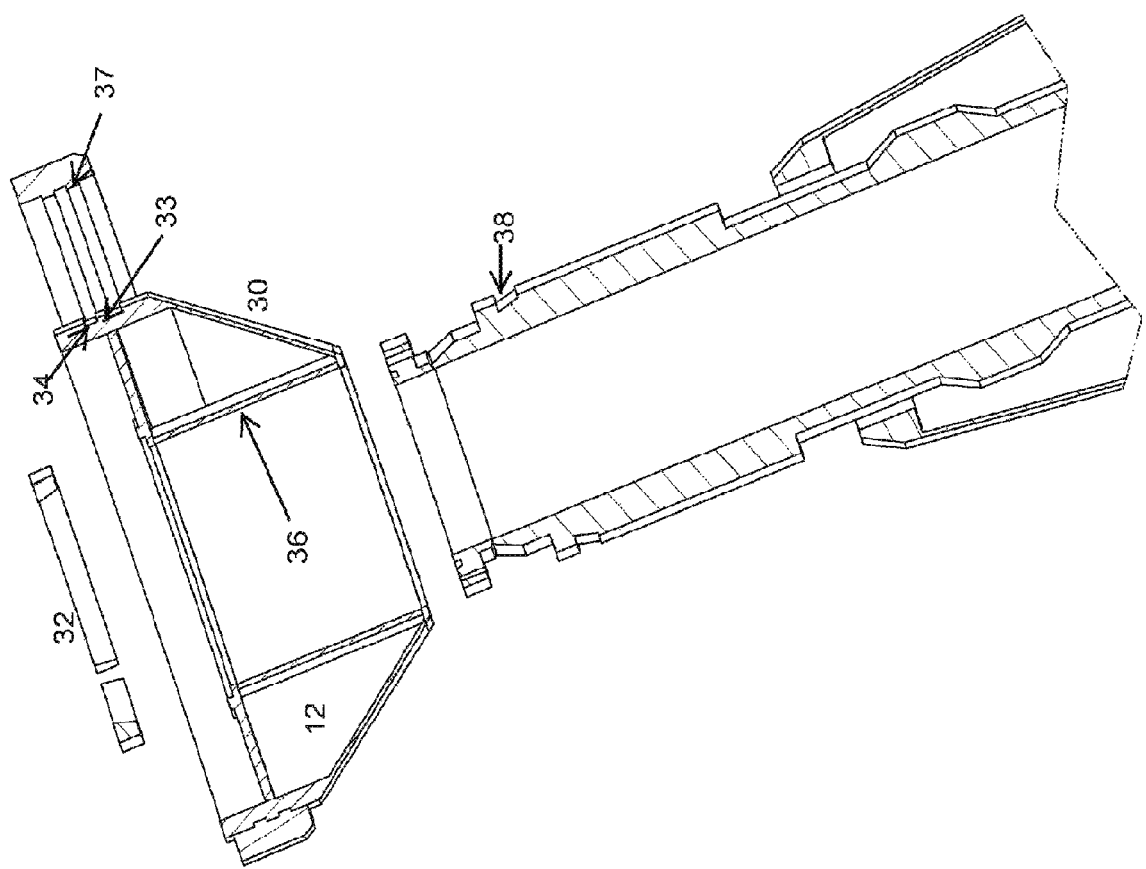
FIG. 5 shows details of the hang off structure.
Figure 5:
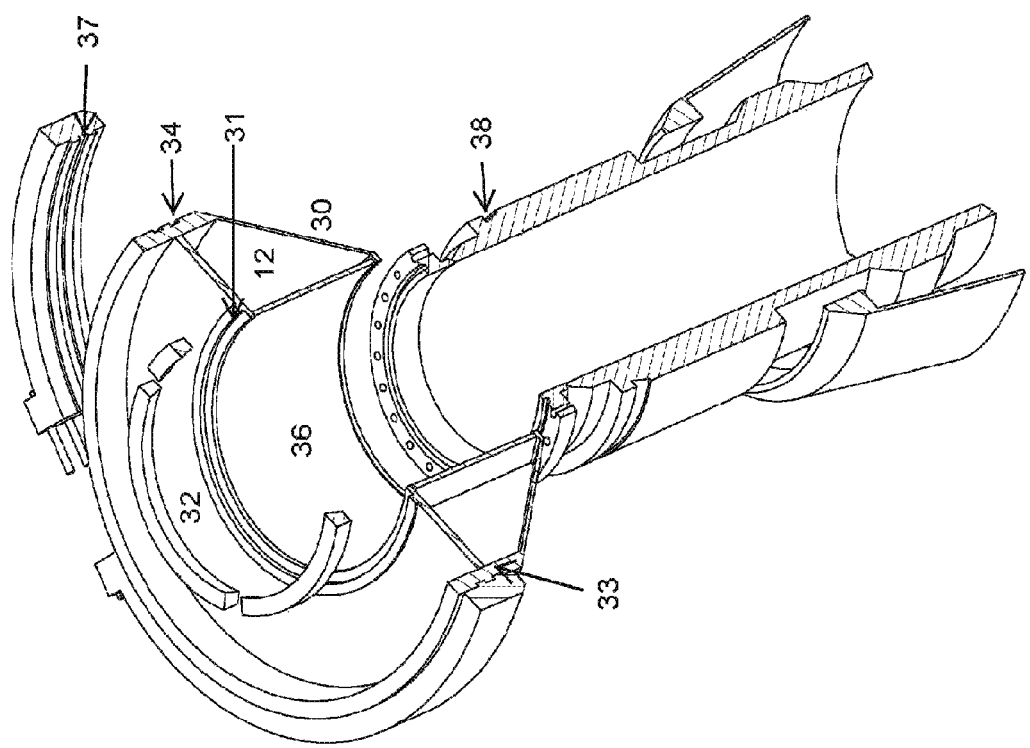

FIG. 5 Illustrates that the hang off structure 12 comprises a toroidal coned section 30 narrowing towards the lower part, with a cylindrical inner surface contacting the connection pipe 4. At the top of the cylindrical section 36 there is a groove 31, which accommodates a spline 32 designed also to fit into a corresponding circumferential groove 38 in the surface of the hang off protrusion 27 on the connection pipe 9. The spline 32 is split in two or more sections and transfers the entire strain of the riser 3 on to the coned section 30. At the top of the coned section 30 there is a cylindrical part 33 with at least one circumferential groove 34 (or protrusion). The entire strain of the riser is then transferred to the hang off face 35 on the top rim of the guide pipe 2 by a hang off segment 13 provided with at least one circumferential protrusion 37 (or groove) corresponding to the one or more grooves 34 (or protrusions). The hang of segment 13 is split in two or more parts and bolted together in order to be firmly fastened to the cylindrical part 33 of the coned section 30. The hang off segments 13, 14 might also be bolted to the cylindrical part 33.

The hang off structure 12 is beneficially coned downward for centralizing purposes whenever the connection pipe 4 with the flexible joint 5 is due to be lowered and re-seated onto the hang off face 35 on the top rim of the guide pipe 2 subsequent to an on board in-service inspection or replacement of the flexible joint 5 and connection pipe 4. If the adapter 9 is split in two or more sections, it is possible to have the hang off structure 12 permanently mounted on the connection pipe 4. This shape is also beneficial for the transfer of the riser suspension loads from the inner cylindrical part 36 to the outer cylindrical part 33 of the hang off structure 12.

In order to perform the operations explained below, it is advantageous to have a crane 20 that can take the entire strain of the riser 3 and pull the riser 3 upward for a length that is longer than the length of the longest of the connection pipe 4 and the flexible joint 5, preferably longer than the total length of the flexible joint 5 and the connection pipe 4, also taking into account the length of the hook, its fastening means, etc.

Figure 6:
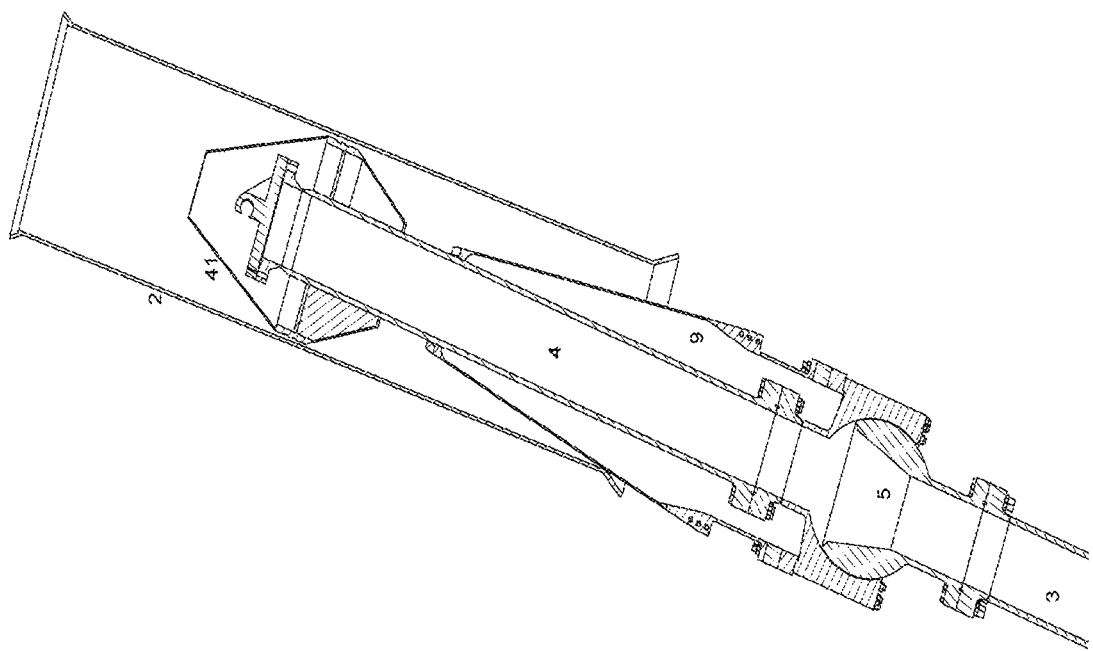
FIG. 6 shows the connection pipe and adapter entering the guide pipe.
Figure 6:
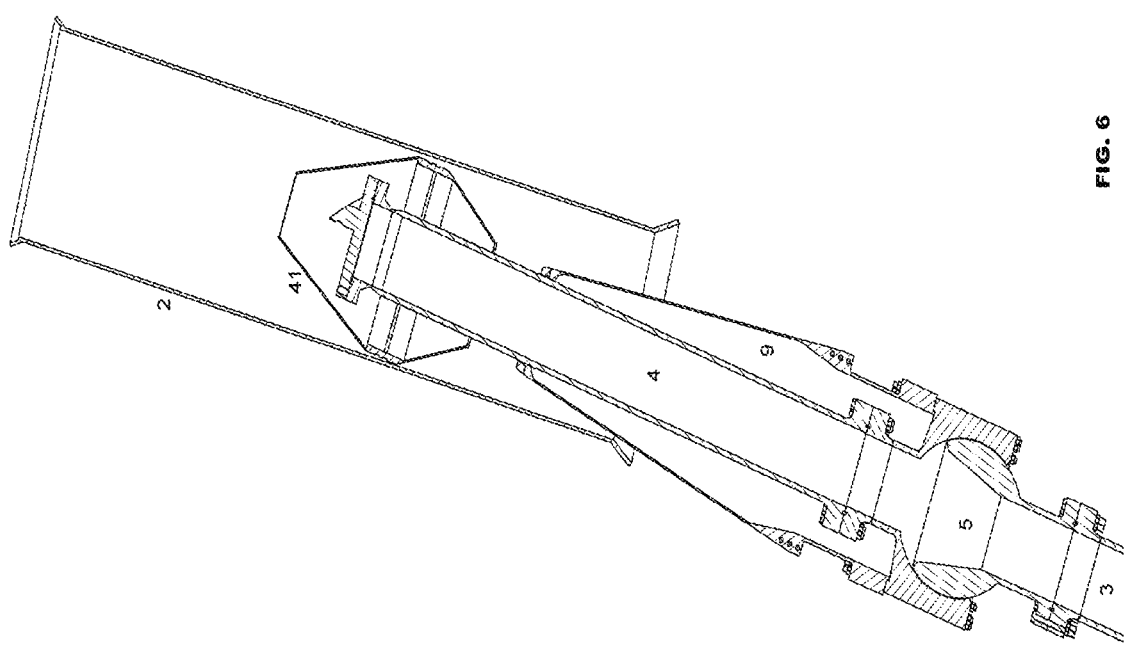

The initial mounting of the riser 3 to a floating structure by means of a termination device takes place at sea with the floating structure anchored in its position under sufficiently calm conditions. FIG. 6 shows the haul-in operation in two stages. In order to ease the operation the guide pipe 2 may have a bell shaped lower end. The operation comprises the steps of:

a) mounting a flexible joint 5 at the top end of the riser 3;

b) mounting a connection pipe 4 at the top of the flexible joint 5;

c) mounting an adapter 9 on to the flexible joint 5 and connection pipe 4;

d) mounting a hang off structure 12 underneath the top flange 1 of the connection pipe 4 (if it is permanently mounted, this step is left out. If it is split in two or more, it may be done before step g);

e) mounting a pull-in wire and a pull-in cone 41 going through the guide pipe 2 on the top flange of the connection pipe 4;

f) pulling the connection pipe 4 and the adapter 9 into the guide pipe 2, as shown in FIG. 5, so that the hang off structure 12 is above the guide pipe 2. The coned adapter 9 gives ample room inside the guide pipe 2 permitting a moderate pendulum motion in the riser 3 at the critical early stage of the pull in operation—a cylindrically shaped adapter 9 with mainly the same diameter as the guide pipe 2 may have caused locking situations at this step;

g) mounting the hang off segments 13, 14 on to the cylindrical part of the hang off structure 12;

h) resting the hang off structure 12 on the hang off face 35 on the top rim of the guide pipe 2;

i) dismounting the pull wire and pull cone 41 j) mounting the top flange 1 to swivel piping 23.

Offshore inspection or replacement or parts susceptible to deterioration during service may be done on board by retrieving the connection pipe, flexible joint and adapter to past the top of the guide tube 2.

The adapter version with bolt rods as illustrated in FIG. 2 requires a free lifting height above the guide tube corresponding with the combined length of the connection pipe and the flexible joint besides length contributions from such as pull-in head, hooks and so forth.

The embodiment illustrated in FIG. 4 with flexible joint 5 and connection pipe 4 in one piece advantageously requires less free lifting height since the bolts need access from top only.

Once in place the flexible joint 5, the connection pipe 4 and the adapter 9 can be serviced or exchanged by carrying out the following steps:

k) dismounting the top flange 1 of the connection pipe 4 from swivel piping 23;

l) mounting a pull wire on the top flange 1 of the connection pipe 4;

m) pulling the riser 3 up until the top flange of the riser 3 is above the guide pipe;

n) mounting a hang off structure 12 including hang off segments underneath the top flange 1 of the riser 3;

o) resting the hang off structure 12 on the hang off face 35 on the top rim of the guide pipe 2;

p) servicing and/or exchanging the flexible joint 5, the connection pipe 4 and/or adapter 9; and q) performing steps k-o in reverse order.

It should be noted that the described embodiments is examples only and that numerous variations and combinations are possible, which are not described specifically here, but still fall within the scope of the independent claims which defines the scope of the invention.

The invention claimed is:

1. A device for terminating a riser in a floating structure, wherein the device comprises:

a flexible joint comprising a lower flange and an upper flange, and a ball joint or flexible part with a rugged housing comprising a circular mating face at a rim of the rugged housing;

a connection pipe comprising a lower flange and an upper flange and a groove, the connection pipe having a length;

a guide pipe firmly fixable to the floating structure, the guide pipe comprising a hang off face on an upper rim of the guide pipe, and a cylindrical rugged body having a diameter which is larger than a diameter of the flexible joint;

a coned hang off structure positioned underneath the upper flange of the connection pipe, the coned hang off structure comprising:

a toroidal coned section narrowing towards a lower part of the toroidal coned section, with a cylindrical inner surface contacting the connection pipe, a spline divided in at least two parts that fit in to a groove at the top of the cylindrical inner surface and the groove in the connection pipe, at least two hang off segments attached to a perimeter of a cylindrical part of the coned hang off structure, the at least two hang off segments providing a circumferential load transferring surface complementary to the hang-off face on the upper rim of the guide pipe;

and an adapter fastened to the housing of the flexible joint comprising:

a mating surface at a lower end of the adapter complementary to a mating surface at the rim of the flexible joint housing;

a lower circumferential support region close to the mating surface;

a further circumferential support region positioned along the length of the connection pipe;

a coned section above the further circumferential support region, ending at a distance from the coned hang off structure and in circumferential sliding contact with the connection pipe;

wherein at least one of the circumferential support regions and the housing of the flexible joint being in close contact with a lower part of the guide pipe.

2. The device according to claim 1 wherein the adapter is split in two or more sections in a longitudinal direction which are bolted together and supplied with grooves and tongues at interfaces of the two or more sections in order to prevent the two or more sections from sliding when bending forces are applied.

3. The device according to claim 1, wherein the two or more sections of the adapter are held together at a top end by a securing ring comprising one or more parts bridging the two or more sections of the adapter and being bolted to the top end by bolts entering the adapter in a direction parallel with an axis of the adapter.

4. The device according to claim 1 wherein the adapter is in one piece having an inner diameter which is slightly larger than an inner diameter of the upper flange of the connection pipe.

5. The device according to claim 1, wherein the connection pipe is provided with protrusions in the circumferential support region(s) along the length of the connection pipe filling a gap between the connection pipe and the adapter.

6. The device according to claim 1 wherein the guide pipe is slightly shorter than a combined length of the connection pipe and the flexible joint.

7. The device according to claim 1 wherein the guide pipe has a bell shaped lower end.

8. The device according to claim 1, wherein the adapter is provided with a cylindrical section stretching from the circumferential support region and upward to the coned section.

9. The device according to claim 1, wherein the coned section of the adapter is a pipe with a radius slightly larger than a radius of the connection pipe, and provided with triangular ribs forming the coned section.

10. The device according to claim 1 wherein a clearance between the surfaces of the flexible joint and/or the adapter transferring radial load and the guide pipe is between 0.5 and 10 mm.

11. The device according to claim 10, wherein the clearance between surfaces of the flexible joint and/or the adapter transferring radial load and the guide pipe is between 0.5 and 10 mm.

12. A method for initial mounting, dismounting and mounting a device according to claim 1, the initial mounting comprising:
 a) mounting a flexible joint at the top of the riser;
 b) mounting a connection pipe at the top of the flexible joint;
 c) mounting an adapter on to the flexible joint and connection pipe;
 d) mounting a hang off structure without hang off segments underneath the upper flange of the connection pipe;
 e) mounting a pull-in wire going through the guide pipe on the upper flange of the connection pipe;
 f) pulling the connection pipe and the adapter into the guide pipe so that the hang off structure is above the guide pipe;
 g) mounting the hang off segments on to the cylindrical part of the hang off structure;
 h) resting the hang off structure on the hang off face on the top rim of the guide pipe;
 i) dismounting the pull-in wire and
 j) mounting the upper flange to the swivel piping and dismounting and mounting the device for service comprising:
 k) dismounting the upper flange of the connection pipe from the swivel piping;
 mounting a pull-in wire on the upper flange of the connection pipe;
 m) pulling the riser up until the upper flange of the riser is above the guide pipe;
 n) mounting a hang off structure including hang off segments underneath the upper flange of the riser;
 o) resting the hang off structure on the hang off face on the top rim of the guide pipe;
 p) servicing and/or exchanging the flexible joint, the connection pipe and/or adapter; and
 q) performing the k-o in reverse order.

* * * * *